US012667049B2

(12) United States Patent
    Gorge et al.

(10) Patent No.:     US 12,667,049 B2
(45) Date of Patent:     *Jun. 30, 2026

---

(54) ACCESS DOOR WITH INTEGRAL CROP DEFLECTOR FOR A COMBINE HARVESTER AND METHOD OF MANUFACTURING THE SAME

(71) Applicant: DEERE & COMPANY, Moline, IL (US)

(72) Inventors: Brian Gorge, Colona, IL (US); Manish Singh, Pune (IN)

(73) Assignee: Deere & Company, Moline, IL (US)

( * ) Notice: Subject to any disclaimer, the term of this patent is extended or adjusted under 35 U.S.C. 154(b) by 162 days.

This patent is subject to a terminal disclaimer.

(21) Appl. No.: 18/618,300

(22) Filed: Mar. 27, 2024

(65) Prior Publication Data

US 2024/0224853 A1     Jul. 11, 2024

Related U.S. Application Data

(62) Division of application No. 16/394,101, filed on Apr. 25, 2019, now Pat. No. 11,997,946.

(51) Int. Cl.
    *A01F 12/26*     (2006.01)
    *A01D 41/12*     (2006.01)
    (Continued)

(52) U.S. Cl.
    CPC .......... *A01D 41/1261* (2013.01); *A01F 7/067* (2013.01); *A01F 12/26* (2013.01);
    (Continued)

(58) Field of Classification Search
    CPC ...... A01F 7/067; A01F 12/26; A01D 41/1261
    See application file for complete search history.

(56) References Cited

U.S. PATENT DOCUMENTS 3,145,715 A     8/1964     Horn
3,464,419 A     9/1969     Knapp et al.
(Continued)

FOREIGN PATENT DOCUMENTS

BE     791338 A     3/1973
CN     1073570 A     6/1993
(Continued)

OTHER PUBLICATIONS

CNIPA; Chinese Office Action issued in application No. 202010330117.9, dated Feb. 12, 2023.

*Primary Examiner* — Alicia Torres
(74) *Attorney, Agent, or Firm* — Taft Stettinius & Hollister LLP; Stephen F. Rost

(57)     ABSTRACT

An access door for a combine harvester includes a body having a top, a bottom, a first side, and a second side. The body includes a height defined between the top and the bottom and a width defined between the first side and the second side. A plurality of ribs is integrally formed in the body for adding rigidity thereto, and a deflector is integrally formed with the body and protrudes therefrom. The deflector has a top surface and a width that is substantially the same as the width of the body. The body is defined within a first plane and the top surface is defined within a second plane such that the second plane is disposed at an angle less than 90° from the first plane.

20 Claims, 8 Drawing Sheets

(51) Int. Cl.
| | |
|---|---|
| *A01F 7/06* | (2006.01) |
| *B29C 49/04* | (2006.01) |
| *B29C 49/42* | (2006.01) |
| *B29L 31/00* | (2006.01) |

(52) U.S. Cl.
CPC .......... *B29C 49/04* (2013.01); *B29C 49/4273* (2013.01); *B29L 2031/724* (2013.01)

(56) References Cited

U.S. PATENT DOCUMENTS

| | | | |
|---|---|---|---|
| 3,470,881 | A | 10/1969 | De Pauw |
| 3,568,682 | A | 3/1971 | Knapp |
| 3,696,815 | A | 10/1972 | Rowland-Hill |
| 3,994,304 | A | 11/1976 | Todd et al. |
| 4,003,384 | A | 1/1977 | Komancheck et al. |
| 4,018,232 | A | 4/1977 | Rowland-Hill et al. |
| 4,177,820 | A | 12/1979 | Rowland-Hill |
| 4,249,543 | A | 2/1981 | Rowland-Hill |
| 5,041,059 | A | 8/1991 | Ricketts et al. |
| 6,325,713 | B1 | 12/2001 | Haar et al. |
| 6,755,735 | B2 | 6/2004 | Linder et al. |
| 7,011,580 | B2 * | 3/2006 | Claeys ................. A01D 61/008 |
| | | | 460/106 |
| 7,473,169 | B2 | 1/2009 | Isaac |
| 7,485,035 | B1 | 2/2009 | Yde |
| 7,731,576 | B2 | 6/2010 | Isaac et al. |
| 10,639,645 | B2 | 5/2020 | Stroitelev |
| 2004/0014512 | A1 | 1/2004 | Linder et al. |
| 2004/0107672 | A1 | 6/2004 | Falato et al. |
| 2009/0186674 | A1 | 7/2009 | Claerhout et al. |
| 2012/0064955 | A1 | 3/2012 | Barrelmeyer et al. |
| 2012/0322521 | A1 | 12/2012 | Baumgarten et al. |
| 2014/0066146 | A1 | 3/2014 | Dilts et al. |
| 2014/0066148 | A1 | 3/2014 | Dilts et al. |
| 2018/0352739 | A1 | 12/2018 | Puryk et al. |

FOREIGN PATENT DOCUMENTS

| | | | |
|---|---|---|---|
| CN | 101653074 | A | 2/2010 |
| CN | 203181621 | U | 9/2013 |
| CN | 105705002 | A | 6/2016 |
| CN | 205694309 | U | 11/2016 |
| CN | 206196351 | U | 5/2017 |
| DE | 1582591 | A | 7/1970 |
| DE | 19812828 | A1 * | 10/1998 ........ B60R 13/0243 |
| EP | 0516889 | A1 | 12/1992 |

* cited by examiner

ACCESS DOOR WITH INTEGRAL CROP DEFLECTOR FOR A COMBINE HARVESTER AND METHOD OF MANUFACTURING THE SAME

RELATED APPLICATIONS

This application is a division application of U.S. patent application Ser. No. 16/394,101, filed Apr. 25, 2019, the disclosure of which is hereby incorporated by reference in its entirety.

FIELD OF THE DISCLOSURE

The present disclosure relates to a harvesting machine, and in particular, to one or more access doors of a combine harvester.

BACKGROUND

Agricultural machines, such as a combine, include different portions or sections for moving crop therethrough. For example, a conventional combine may include a cleaning shoe or system that is located between the wheels of the combine, behind the cab and below the engine. The design of the cleaning system is such that a large fan or blower provides air driven upward therefrom. The cleaning system may include grating in the form of a large cylindrical or semi-circular body through which grain and other residue may be separated and falls through and onto a cleaning shoe (or sieve). Air from the blower is generated upward through the flat grating and cleaning shoe and lifts material other than grain ("MOG") such as straw and carries the material to the rear of the combine on a flow of air. Grain that falls through a large flat screen of the cleaning system may collect near a bottom of the combine where it is lifted up by the air flow and deposited into a grain tank. The MOG is further carried by the air flow over the top of the sieve and to the rear of the combine where it is deposited onto the underlying ground. In effect, this performs the cleaning function of the combine. The MOG, which is carried by the air flow to the rear of the combine, may be spread on the ground or otherwise deposited on the ground in a narrow windrow or swath where it is later picked up.

SUMMARY

In one embodiment of the present disclosure, an access door for a combine harvester includes a body having a top, a bottom, a first side, and a second side, the body including a height defined between the top and the bottom and a width defined between the first side and the second side; a plurality of ribs integrally formed in the body for adding rigidity thereto; and a deflector integrally formed with the body and protruding therefrom, the deflector comprising a top surface; wherein, the deflector comprises a width that is substantially the same as the width of the body; wherein, the body is defined within a first plane and the top surface is defined within a second plane, the second plane being disposed at an angle less than 90° from the first plane.

In a first example of this embodiment, the body, the plurality of ribs and the deflector are formed of plastic. In a second example, the angle is between 5° and 85°. In a third example, the body has a height greater along the first side than along the second side. In a fourth example, a seal is disposed along the top, the first side and the second side. In a fifth example, a flange formed along the bottom of the body.

In a sixth example, one or more ridges is integrally formed in the body, the one or more ridges being oriented approximately perpendicular to the plurality of ribs. In a seventh example, at least one handle and one latch are coupled to the body, the at least one handle is coupled to the body on a side opposite of the deflector.

In another embodiment of the present disclosure, a combine harvester includes a housing including a chassis, the housing defining an interior through which crop material flows in a generally rearward direction; a crop processing system located within the interior, the crop processing system including at least a threshing section and a separating section, where the separating section is rearward of the threshing section; a plurality of access doors removably coupled to the chassis, the plurality of access doors aligned along at least one side of the housing and spanning a distance defined by the threshing section and the separating section; each of the plurality of access doors comprising a body having a top, a bottom, a first side, and a second side; a plurality of ribs integrally formed in the body for adding rigidity thereto; and a deflector integrally formed with the body and protruding into the interior of the housing for deflecting crop material away from the respective access door, the deflector comprising a top surface; wherein, the deflector comprises a width that is substantially the same as the width of the body; wherein, the body is defined within a first plane and the top surface is defined within a second plane, the second plane being angularly disposed with respect to the first plane.

In one example of this embodiment, the plurality of access doors includes a first access door and a second access door, the first access door and second access door having substantially the same width but different heights. In a second example, each of the plurality of access doors comprises the same approximate width, but each of the plurality of access doors comprises a different height. In a third example, a seal is disposed along at least the top, the first side and the second side of the body of each access door; and a flange is formed along the bottom of the body of each access door, wherein the flange is coupled to the chassis.

In another example, one or more ridges is integrally formed in the body of each of the plurality of access doors, the one or more ridges being oriented approximately perpendicular to the plurality of ribs. In a different example, a first handle and latch assembly is coupled adjacent to the first side of the body of each access door and a second handle and latch assembly is coupled adjacent to the second side of the body of each access door; wherein, the first and second handle and latch assemblies comprise a latched position and an unlatched position, the respective access door being removable from the chassis in the unlatched position; further wherein, the first handle and latch assembly is rotatable relative to the body between the latched position and the unlatched position.

In yet another example of this embodiment, a cleaning system is disposed in the interior at a location at least partially below the crop processing system and the plurality of access doors, the cleaning system configured to remove residue from the crop material; wherein, the deflector of each of the plurality of access doors is disposed within the interior to deflect the rearward flow of the crop material to the cleaning system.

In a further embodiment of the present disclosure, a method of manufacturing an access door for a combine harvester includes providing a material from which the door is to be formed; placing the material in a mold having a shape and size of the access door; performing a molding process with the material in the mold; and manufacturing the access door from the material during the molding process, wherein the molding step comprises forming a body of the access door having a top, a bottom, a first side, and a second side; integrally forming a deflector and a plurality of ribs with an inner surface of the body, the deflector including a top surface; forming a width of the deflector to be approximately the same as a width of the body; forming the top surface of the deflector to be oriented at an angle less than 90° from the body.

In one example of this embodiment, the method may include forming at least one ridge integrally in the body during the molding process, the at least one ridge extending the width of the body. In a second example, the method may include removing a first portion of the body by cutting along the at least one ridge from the first side to the second side; and forming a second access door with a remaining portion of the body, the second access door having a height that is less than a height of the body before the removing step.

In another example, the method may include removing a second portion from the remaining portion of the body by cutting along a second ridge formed therein; and forming a third access door after the second portion is removed, the third access door having a height that is less than the height of the second access door. In a further example, the method may include forming a flange in the bottom of the body; and installing a seal around at least a portion of the top, the first side and the second side of the body.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
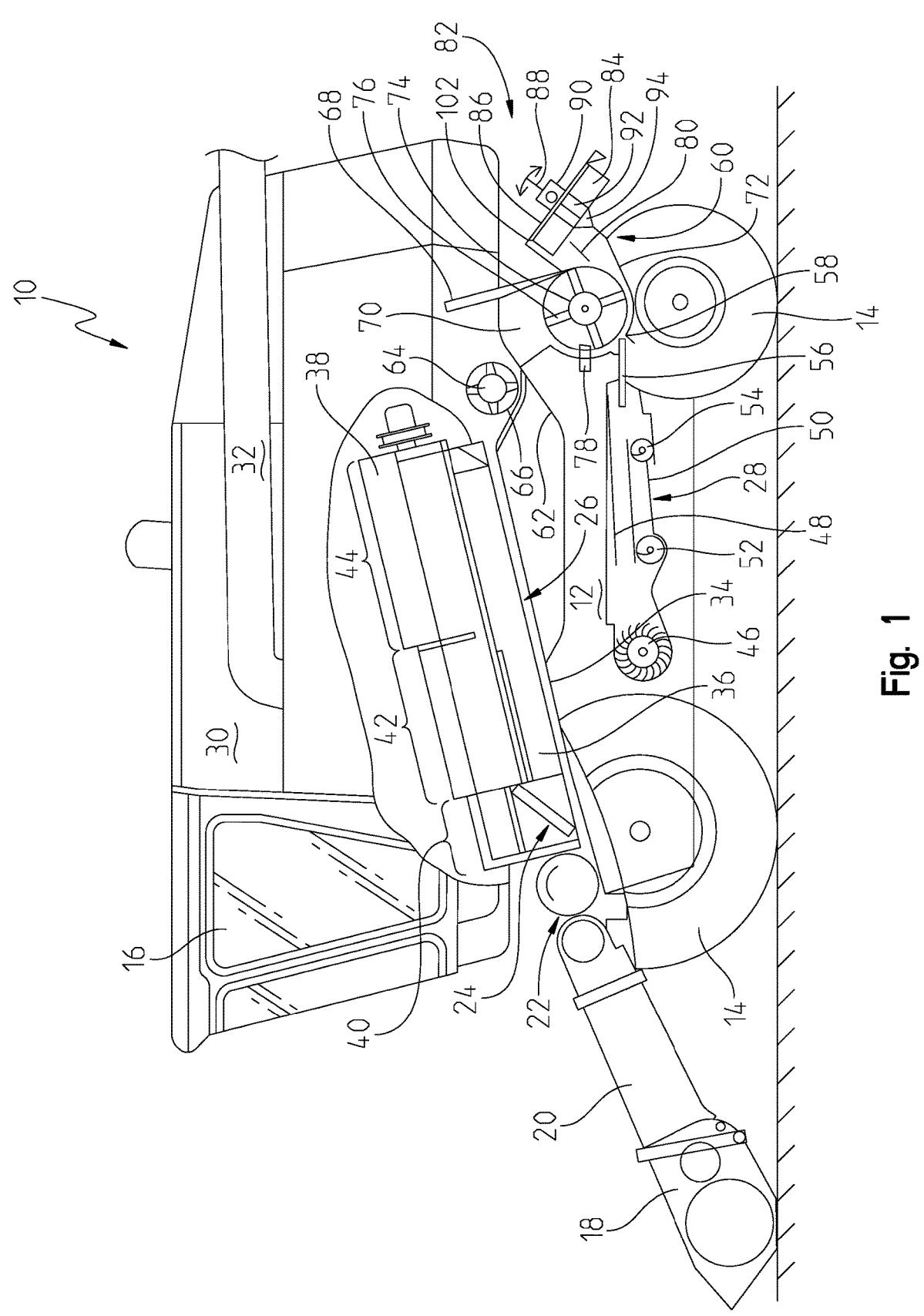
FIG. 1 is a partial section of a side view of a combine with a chopper rotor assembly and cleaning system.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an embodiment of an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutter head 18 is disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by means of an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by means of an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

During a harvesting operation, crop material flows from the front of the machine to the rear thereof. During the operation, it is desirable to keep or maintain all of the grain and chaff inside the machine. To do so, it is necessary to envelope or enclose the threshing and separation sections of the harvester, particularly along the sides thereof. In doing so, grain or other crop cannot escape from the harvester, and dust, dirt and other debris that normally accumulates within the machine can be reduced. In addition, it is also desirable to have access to the interior of the combine, and particularly to access the concaves, grates and chaffers which may require periodic service or repair.

In many conventional harvesting machines, a door may be mechanically bolted to the chassis or frame of the machine. It often required time and effort to remove the door before access to the interior of the machine was possible. In addition to the labor, parts may be expensive or get lost and there is a continuous need to locate new parts to reinstall the door. Besides the labor and parts, however, the biggest drawback to the conventional access door on a harvesting machine was its inability to aid in directing crop flow rearward from the separator concaves and grates, and to further prevent or reduce the accumulation of material (e.g., crop, grain, dirt, dust, debris, etc.) in gaps along the edges between the door and chassis. Moreover, material may fall or collect on the cleaning shoe instead of flowing rearward. Thus, there is a need for an improved access door which is easier and less expensive to manufacture and which also can aid with crop flow and the reduction of debris and other particulates from collecting in unwanted areas in the machine.

Figure 2:
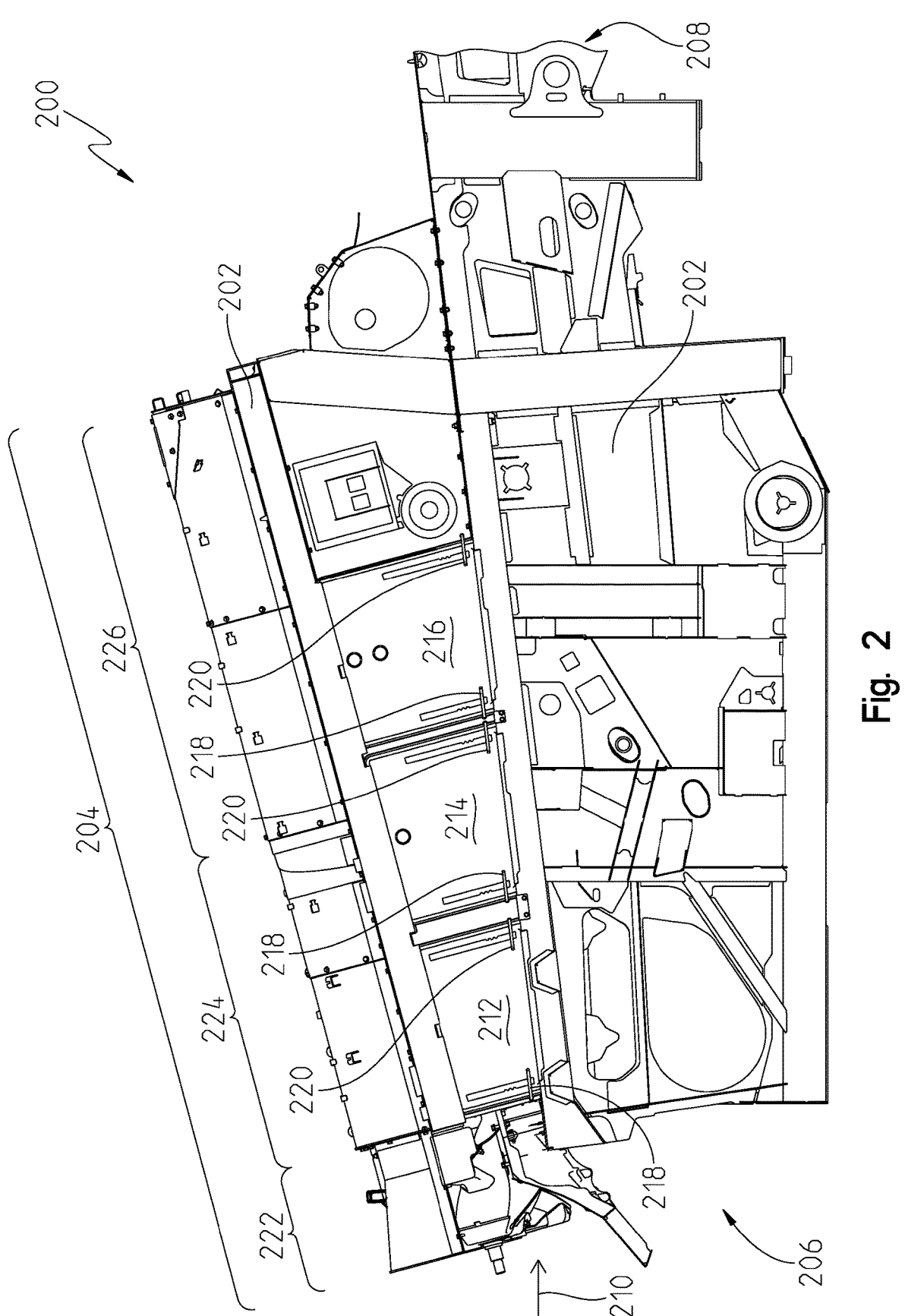
FIG. 2 is a partial section of a side view of a side portion of a combine with a plurality of access doors.

Referring to FIG. 2, one embodiment of a combine harvester or harvesting machine 200 is shown. The harvester 200 is shown with portions of it removed to better illustrate some of the features of the present disclosure. In FIG. 2, the harvester 200 may include a chassis 202 or frame which is supported by one or more ground-engaging mechanisms (not shown) such as wheels or tracks. The chassis 202 partially provides an outer housing which supports or encloses other functioning components of the harvester 200. For example, the harvester 200 may include a crop processing system 204 similar to the one described above with respect to FIG. 1. For example, the system 204 may include a charging section 222 located towards a front 206 of the system 204 and a separating section 226 located towards a rear 208 of the system 204. A threshing section 224 may be located between the charging section 222 and the separating section 226. The function of the charging section 222, threshing section 224 and separating section 226 is not described with respect to FIG. 2, but each section may perform substantially the same function as any convention section within a combine and as described above with respect to FIG. 1.

As is known, crop may be collected and processed at the front 206 of the machine 200 and then forced in a rearward direction indicated by arrow 210 in FIG. 2. As the crop flows in the rearward direction 210, and particularly through the threshing section 224 and separating section 226, the harvester 200 may include a plurality of access doors for preventing or reducing the amount of crop that can escape from within. In particular, the plurality of access doors may include a first access door 212, a second access door 214, and a third access door 216. The first access door 212 may be located furthest to the front 206 and the third access door 216 may be located furthest to the rear 208.

Each access door, or door, may be coupled to the chassis 202 of the harvester 200. Although not shown, a seal (e.g., a rubber seal) may be disposed along an inner surface of at least three sides of each door to seal the door to the harvester 200. Each door may also include a first handle 218 and a second handle 220 for releasably coupling the door to the chassis 202. As will be described below, each of the first and second handles may be pivoted or rotated approximately 90° to release the door from the chassis 202. Once the door is released from the chassis 202, it may be removed and set aside to allow for service or repair of the harvester 200.

As shown in FIG. 2, the first door 212 is located generally along or in the threshing section 224, and the third door 216 is located generally along or in the separating section 226. The second door 214 may be located along or in the threshing section 224, the separating section 226, or partially span both the threshing and separating sections. In FIG. 2, for example, the second door 214 is shown spanning the width of at least a rearward portion of the threshing section 224 and at least a forward portion of the separating section 226.

Figure 4:
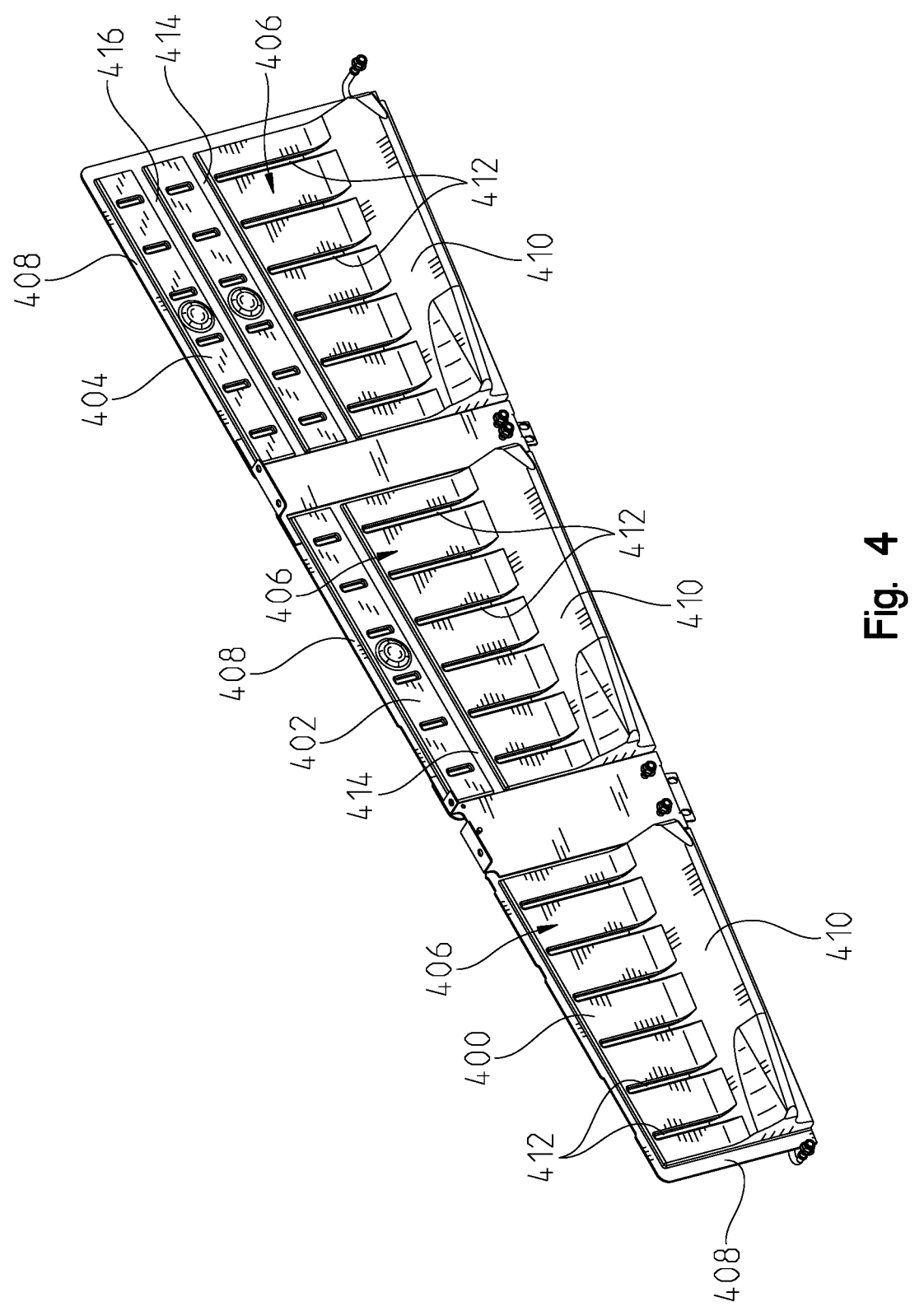
FIG. 4 is a perspective view of an interior of a plurality of access doors for being removably coupled to a combine harvester.
Figure 5:
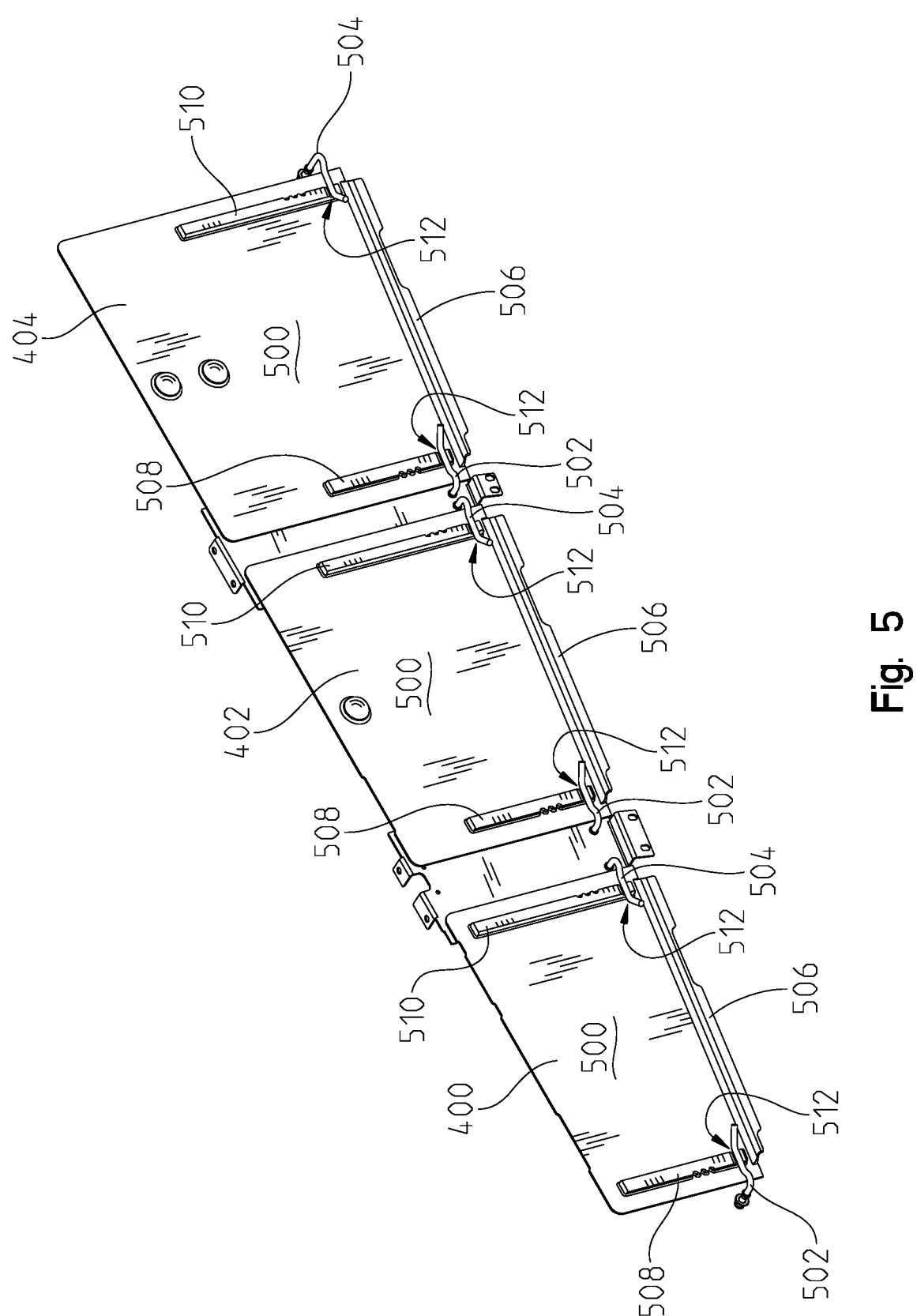
FIG. 5 is a perspective view of an exterior of the plurality of access doors of FIG. 4.

As also shown in FIG. 2, and will be addressed further with respect to FIGS. 4 and 5, each of the first access door 212, second access door 214, and third access door 216 may be formed of a different size. In particular, the first access door 212 may be the smallest of the three doors, whereas the third access door 216 may be the largest of the three doors. In one embodiment, the first door 212 may have a smaller height than the second access door 214 and the third access door 216. In another embodiment, the second access door 214 may be shorter than the third access door 216. In a further embodiment, the difference in height between the first access door 212 and the second access door 214 may be approximately the same as the difference in height between the second access door 214 and the third access door 216. In yet another embodiment, the width of each door may be approximately the same. In yet a further embodiment, the only difference between the first access door 212, the second access door 214, and the third access door 216 is the respective height of each.

While FIG. 2 illustrates three access doors, the present disclosure is not limited to any specific number of access doors. The principles and teachings of the present disclosure may apply to a harvester having any number of doors from a single access door to two or more access doors. The overall size of the harvester, for example, may determine the number of access doors.

Figure 3:
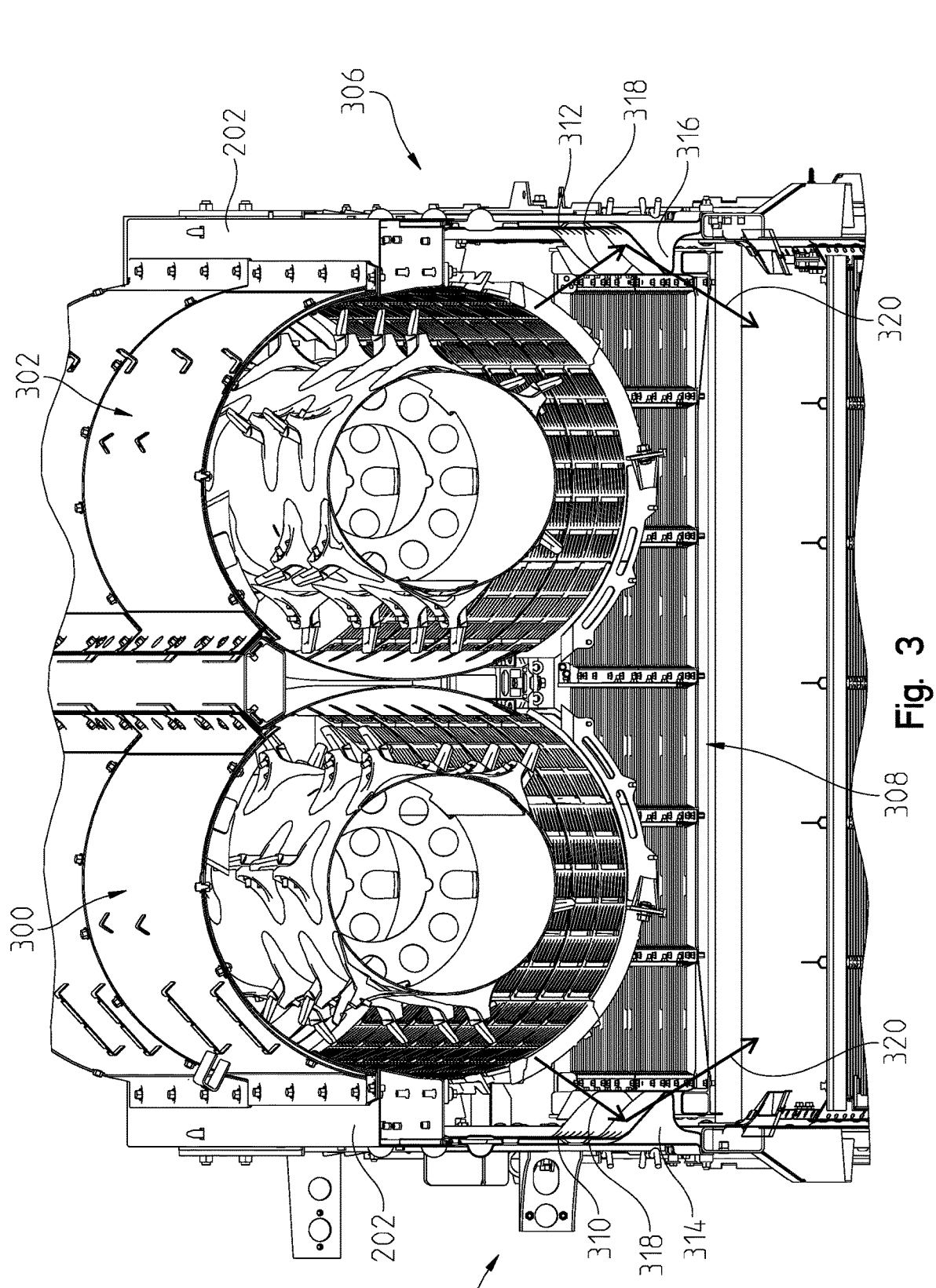
FIG. 3 is a partial perspective view of a dual rotor combine with access doors on each side thereof.

Referring to FIG. 3, a different embodiment of a combine harvester is shown. Here, the combine harvester is shown as a dual rotor combine including a first rotor assembly 300 and a second rotor assembly 302. The first rotor assembly 300 may be disposed on a first side 304 of the combine and the second rotor assembly 302 may be disposed on a second side 306 thereof. A portion of a cleaning shoe or chaffer (i.e., return pan) 308 is shown below the pair of rotor assemblies and below (and partially rearward of) the crop processing system 204. A first access door 310 is shown coupled to the combine along the first side 304 thereof, and a second access door 312 is shown coupled to the second side 306 thereof. While only a single access door is shown on each side, it is to be understood that additional access doors may be disposed along each side. For instance, in one embodiment, the first door 310 and second door 312 may be any one of the first access door 212, second access door 214, or third access door 216 of FIG. 2.

It is desirable for the crop to be distributed or flow to the middle of the cleaning shoe or chaffer 308 for processing, rather than collect along the sides of the machine near each access door. Thus, in the embodiment illustrated in FIG. 3, the first access door 310 may include a first integrally-formed deflector 314 and second access door 312 may include a second integrally-formed deflector 316. Each deflector may be integrally formed with an inner surface of the respective access door and protrude at an angle into the interior of the combine. As it does, crop may flow from the front of the combine in a direction indicated by arrow 318. In conventional harvesting machines, the crop and other material may collect along the first side 304 and second side 306 of the combine below each respective access door. With the deflectors, however, the crop may engage the first deflector 314 and second deflector 316 and be diverted along a direction indicated by arrow 320 towards a center or middle of the chaffer (i.e., return pan) 308 or the cleaning shoe sieve (or, alternatively referred to as a chaffer).

In FIGS. 4 and 5, a plurality of access doors for a harvesting machine such as the dual rotor combine of FIG. 3 are shown. In FIG. 4, the interior or inner side of the doors is shown, whereas the exterior or outer side of the doors is shown in FIG. 5. In particular, the plurality of access doors includes a first access door 400, a second access door 402, and a third access door 404. While three access doors are shown, it is understood that any embodiment of the present disclosure may include one or more access doors. Each access door includes an inner surface 406 (FIG. 4) and an outer surface 500 (FIG. 5). An outer seal 408, e.g., formed of rubber or similar type of sealing material, may partially surround each door. For example, the seal 408 may be disposed along a top and both sides of each door.

Each of the plurality of access doors in FIGS. 4 and 5 may include a deflector 410. The deflector 410 may be integrally formed with the inner surface 406 of each door. Moreover, the deflector 410 may be integrally formed in a lower portion of each door, and span substantially the entire width of each respective door. Portions of the deflector 410, particularly at its outer edges, may be chamfered to better facilitate the manufacturing process of forming the access doors.

A plurality of ribs 412 may be formed in the inner surface 406 of each access door. The plurality of ribs 412 may add rigidity and support to the access door. Each of the plurality of ribs 412 may be formed substantially vertically and thus at least partially perpendicular to the deflector 410. The plurality of ribs 412 do not form part of the deflector 410, but rather may extend from a top portion of the respective access door to a top edge of the deflector 410, as shown in FIG. 4. Each rib 412 may protrude outwardly from the inner surface 406 of the access door.

In FIG. 4, the third access door 404 may be the largest of the plurality of access doors. In this instance, the third access door 404 may include a first ridge 414 and a second ridge 416. The first ridge 414 and second ridge 416 may be substantially disposed in a horizontal orientation with respect to the door 404, and therefore are substantially perpendicular to the plurality of ribs 412 previously described.

As will be described further below, the first ridge 414 and second ridge 416 may define cut lines for forming the first access door 400 and second access door 402. In other words, in at least one embodiment, the material of the third access door 404 located above the second ridge 416 may be removed to form the second access door 402. Moreover, the material of the third access door 404 located above the first ridge 414 may be removed to form the first access door 400. As such, the present disclosure advantageously provides a manufacturing method (which is described in greater detail below with respect to FIG. 8) in which a single access door is manufactured, and then further processing may be incorporated to remove material to form either the first or second access door.

In FIG. 5, the exterior of the plurality of access doors is shown. It is noted that the plurality of ribs 412, the first ridge 414, and the second ridge 416 are not formed on the outer surface 500 of each door. Each of the access doors does, however, include a first handle 502 and a second handle 504 for releasably securing the access doors to the harvesting machine. The first handle 502 may be releasably coupled to a first latch 508, and the second handle 504 may be releasably coupled to a second latch 510. Both handles may be rotated approximately 90° to disengage the latches and allow the respective access door to be disconnected and removed from the machine. The latches 508, 510 may include a groove or slot 512 defined therein which captures the respective handle in the latched position of FIG. 5. The handles may be biased, e.g., spring-loaded, such that a user must rotate the handles 502, 504 by 90° to release the latches from engaging the chassis on the harvester.

In FIG. 5, the plurality of access doors are shown including a flange 506 located along a bottom edge thereof for coupling to the chassis. The flange 506 may engage a slot or opening formed in the chassis for at least partially coupling each access door to the chassis. Each door may include one or more flanges 506 for coupling to the chassis.

Figure 6:
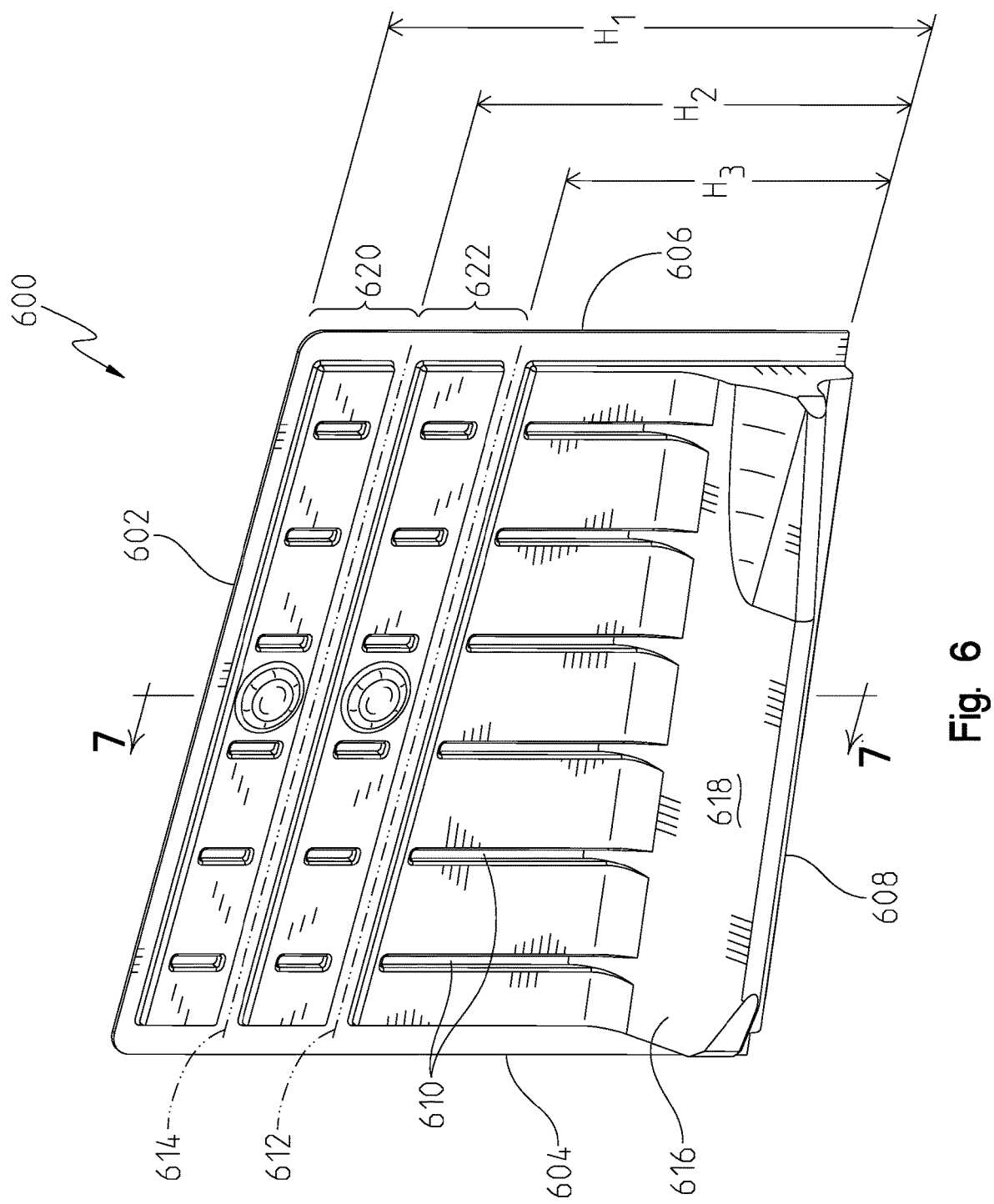
FIG. 6 is a perspective view of an interior side of an access door for a combine harvester.

Referring now to FIG. 6, another embodiment of an access door 600 is shown. The access door 600 may correspond with the third access door 216 of FIG. 2 and the third access door 404 of FIGS. 4 and 5. In any event, the access door 600 may be formed of a plastic or other lightweight material via a molding process. For example, the access door 600 may be formed of a plastic material via a blow-molding process.

Figure 7:
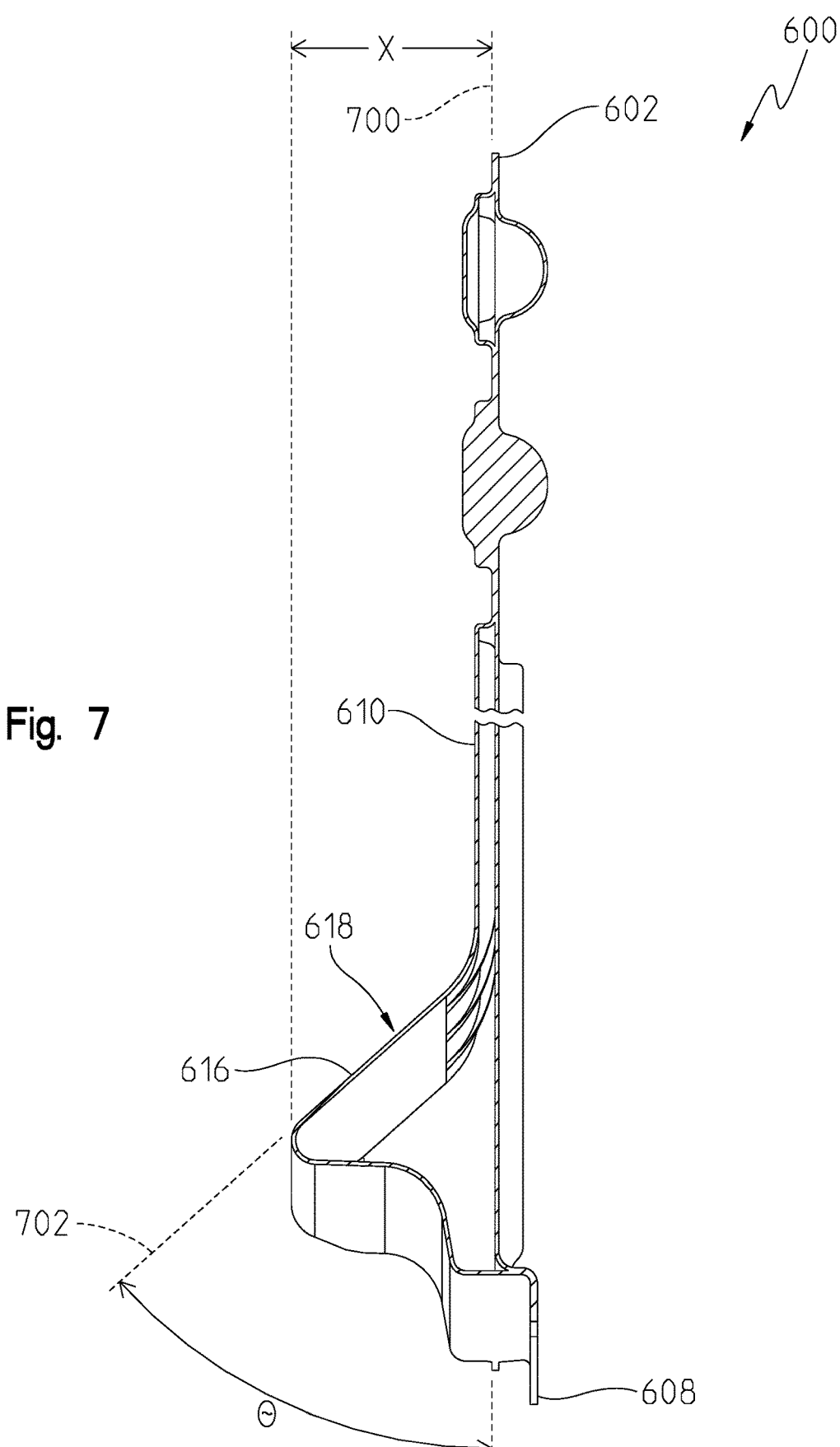
FIG. 7 is a cross-sectional view along line 7-7 in FIG. 6 of the access door.

As shown, the access door 600 may include an outer perimeter formed by a top edge 602, a bottom edge 608, a first side edge 604, and a second side edge 606. In one embodiment, the first side 604 has a greater height than the second side 606 such that the top edge 602 angles downwardly from the first side 604 to the second side 606. The door 600 may include a deflector 616 integrally formed therewith. The deflector 616 may include an angled surface 618 that defines a deflector plane 702 (see FIG. 7). As shown in FIG. 7, the access door 600 may generally be arranged within a door plane 700. The deflector plane 702 may be oriented at an angle, $\Theta$, with respect to the door plane 700. For purposes of this disclosure, the angle $\Theta$ may be referred to as the deflector angle. The deflector angle, $\Theta$, may be disposed relative to the door plane 700 to direct or deflect crop flow towards the chaffer (i.e., return pan) or cleaning shoe sieve (i.e., chaffer). Moreover, the deflector angle may be set such that material and debris does not collect along the sides of the harvester below or adjacent to the access door.

In one example, the deflector angle may be in the range of 1-89°. In a second example, the deflector angle may be between 5-85°. In a further example, the deflector angle may be between 15-75°. In yet a further example, the deflector angle may be between 30-65°. In any event, the deflector angle may be defined at any angle that is able to deflect crop from the sides of the harvester to the middle of the chaffer (i.e., return pan) or cleaning shoe sieve (i.e., chaffer).

As further shown in FIG. 7, the deflector 616 may be integrally formed with an inner surface of the respective access door and protrude at an angle into the interior of the combine. In particular, the deflector 616 may protrude by a distance, X, from the door plane 700 into the interior of the combine. The distance, X, may be one or more inches up to one or more feet. The distance, X, is not intended to be limiting for the purposes of this disclosure, and it is sufficient for the deflector 616 to simply protrude at an angle, $\Theta$, into the interior of the combine to assist with crop flow.

Returning to FIG. 6, the access door 600 may be formed with a plurality of ribs 610 that extend substantially vertically or angularly between the top edge 602 of the door to the deflector 616. As shown, the plurality of ribs 610 may be partially formed in the deflector 616. In other embodiments, the plurality of ribs 610 may not be formed in any part of the deflector 616. The plurality of ribs 610, however, are generally formed to add rigidity and support to the access door 600.

The access door 600 may also include a first ridge that defines a first cut line 612 and a second ridge that defines a second cut line 614. The first ridge may correspond with the first ridge 414 in FIG. 4, and the second ridge may correspond with the second ridge 416 of FIG. 4. As previously described, the access door 600 of FIG. 6 may be repeatedly manufactured by the same tool or mold, and then further processed by removing material to achieve a smaller access door. For example, a first portion 620 of material that forms the top edge 602 of the door 600 may be removed (e.g., cut by a robot or other tool) along the second cut line 614. Once the first portion 620 of material is removed, the resulting access door may have a second height, $H_2$. The original access door 600 may have a first height defined as $H_1$, which corresponds with the tallest height of the access doors.

In a further example, a smaller access door may be formed by removing the first portion 620 of material and a second portion 622 of material from the access door 600 by machining or otherwise removing (e.g., cutting by a robot or other tool) both portions along the first cut line 612. Once this is done, the access door may have a third height corresponding to $H_3$. The third height is less than the second height, which is less than the first height. In FIG. 2, for example, the first access door 212 may have a height corresponding with the third height, the second access door 214 may have a height corresponding with the second height, and the third access door 216 may have a height corresponding with the first height. Similarly, in FIG. 4, the first door 400 may have a height corresponding with the third height, the second access door 402 may have a height corresponding with the second height, and the third access door 404 may have a height corresponding with the first height. In each embodiment, the access door having the first height may be used to form the smaller doors.

While the access door 600 of FIG. 6 is shown including a first ridge and a second ridge, and thus defining the first cut line 612 and the second cut line 614, the present disclosure is not intended to be limited to having only two cut lines. In a further embodiment, the access door may be formed to include a plurality of ridges, each of which defines a cut line corresponding to a different height of an access door. Thus, for example, one access door may include three ridges each of which define a first cut line, a second cut line and a third cut line. In this example, up to four access doors having different heights may be formed. In yet another example, one access door may have X number of ridges, each of which defines a cut line, such that up to X+1 access doors may be manufactured from the same tooling and process. As a result, multiple access doors of varying heights may be manufactured from the same process and with the same tooling, which is more cost effective and reduces the complexity of the manufacturing process.

In one aspect of the illustrated embodiment of FIG. 6, the deflector 616 may be integrally formed with the door at any location between the bottom edge 608 and the first cut line 612. Thus, while the deflector 616 is generally shown being formed closer to the bottom edge 608 of the door, it may be possible and desirable to form the deflector 616 at a location closer to the first cut line 612 in other embodiments. Moreover, while the width of the deflector 616 is generally shown to extend between a first side edge 604 and a second side edge 606 of the door, it is to be understood that in other embodiments the width of the deflector 616 may be less than the distance defined between the first side edge 604 and the second side edge 606.

Figure 8:
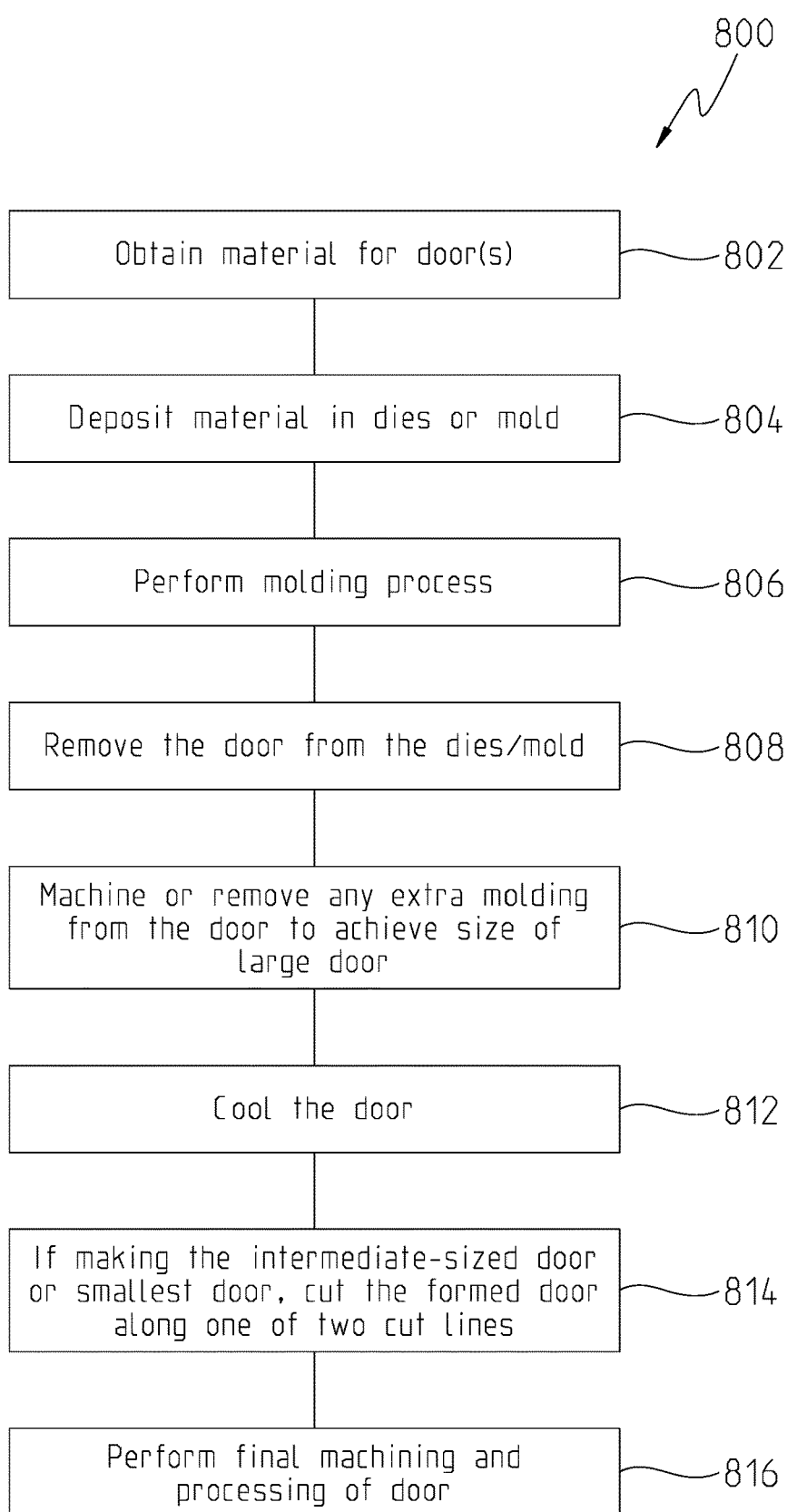
FIG. 8 is a flow diagram of a method of manufacturing an access door for a combine harvester.

Referring to FIG. 8, one embodiment of a method of manufacturing an access door is shown. The method 800 may include one or more blocks or steps that is executed to form the access door. While FIG. 8 represents one such method for forming the door, it is to be understood that the blocks or steps illustrated in FIG. 8 are done so only as one such example, and these blocks or steps are not intended to be shown in any specific sequential order. In other words, a similar yet different method may be executed where one or more of the blocks or steps shown in FIG. 8 may be omitted or performed before or after another block or step. Furthermore, additional blocks or steps not shown in FIG. 8 may form part of a different method of manufacturing an access door.

In FIG. 8, a first block 802 of the method 800 may be executed by first obtaining the material for forming the door. The material may be any lightweight material that can be structurally supportive and withstand the environment of a harvesting machine. Without limiting the type of material to be used, one example of a type of material that may be used is a plastic or resin. For example, high-density polyethylene (HDPE) may be used as the material to form the door. The type of plastic or resin, however, may be selected at the time of manufacture, and is not intended to be limiting for purposes of this disclosure.

For purposes of FIG. 8, the access door may be formed by a molding process such as a blow-molding process. A blow-molding process may use an inner skin and an outer skin to form the mold. The blow-molding process in FIG. 8 may include several blocks or steps including mixing, melting and pushing plastic (extrusion) to form it into a tube called a parison that will be used to make the part in block 804. The mold may be used to make the access door to any desired shape. The mold can include two halves (e.g., skins) that are closed around the molten parison. In block 806, air or another gas may then be blown into the inside of the parison to expand the molten plastic against the mold surface. The mold may be cooled on a cooling rack to set the plastic to the new shape of the mold. In block 808, the molded plastic access door is removed from the mold, separated from excess parison material called flash in block 810, and finished by allowing the door to cool in block 812. In some instances, the finishing steps can be completed in-mold, but in other instances some steps may involve secondary operations.

As described above, shorter access doors may be manufactured from the larger door. In block 814, for example, a robot or other cutting tool may remove a portion from the original access door in order to form an intermediate-sized door or the smallest door for the harvesting machine. As described with reference to FIG. 6, the original access door 600 may include a first cut line 612 and a second cut line 614, both of which are formed by ridges. The robot or cutting tool can cut the plastic door along either cut line to form the desired door.

Once the access door is finished, any final machining, processing and assembly may be executed in block 816. For example, the handles and door latches may be assembled to each door.

The aforementioned molding process may be used to form the access door along with the deflector. The deflector may be integrally formed with the door during the molding process. The removed portion of the original door may be done along a cut line which is located near the top edge of the door, and opposite of where the deflector is formed in the door. As such, regardless of how much material is removed from the original door, the resulting access door may include a deflector as described herein.

While blow-molding has been described as one process for manufacturing the access door, it may also be possible to form the access door by rotational molding or thermoforming processes. Other molding processes may be used in part or whole, as well.

While plastic or resin is described as the material for the manufacturing process, in other embodiments it may be possible to use aluminum or steel. In these embodiments, the resulting access door may include a deflector, but the deflector may be mechanically fastened to the door via bolts or other fasteners.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An access door for a combine harvester, comprising:
   a body having a top, a bottom, a first side, and a second side, the body including a height defined between the top and the bottom and a width defined between the first side and the second side;
   a plurality of ribs integrally formed in an inner surface of the body for adding rigidity thereto;
   a deflector integrally formed with the body and protruding from the inner surface of the body, the deflector comprising a top surface;
   a ridge integrally formed in the body, the ridge intersecting the plurality of ribs and defining a cut line for forming a smaller access door from the body, the smaller access door retaining the deflector;
   wherein, the deflector comprises a width that is less than or equal to the width of the body;
   wherein, the body is defined within a first plane and the top surface is defined within a second plane, the second plane being disposed at an angle less than 90° from the first plane.

2. The door of claim 1, wherein the body, plurality of ribs and deflector are formed of plastic.

3. The door of claim 1, wherein the angle is between 5° and 85°.

4. The door of claim 1, wherein the body has a height greater along the first side than along the second side.

5. The door of claim 1, further comprising a seal positioned along at least one of the top, the bottom, the first side and the second side.

6. The door of claim 1, further comprising a flange formed along the bottom of the body.

7. The door of claim 1, wherein the ridge comprises one or more ridges, and wherein the one or more ridges are angularly oriented to the plurality of ribs.

8. The door of claim 1, further comprising at least one handle and one latch coupled to the body, the at least one handle being coupled to the body on a side opposite of the deflector.

9. The door of claim 1, wherein each of the plurality of ribs extend along the inner surface of the body to the top surface of the deflector.

10. A method of manufacturing an access door for a combine harvester, comprising:
    providing a material from which the door is to be formed;
    placing the material in a mold having a shape and size of the access door;
    performing a molding process with the material in the mold; and
    manufacturing the access door from the material during the molding process, wherein the molding step comprises:
    forming a body of the access door having a top, a bottom, a first side, and a second side;
    integrally forming a deflector and a plurality of ribs with an inner surface of the body, the deflector including a top surface;
    forming the top surface of the deflector to be oriented at an angle less than 90° from the body; and
    forming a ridge in the body, the ridge intersecting the plurality of ribs and defining a cut line for forming a smaller access door from the body, the smaller access door retaining the deflector.

11. The method of claim 10, wherein the ridge extends the width of the body.

12. A method of manufacturing an access door for a combine harvester, comprising:

providing a material from which the door is to be formed;

placing the material in a mold having a shape and size of the access door;

performing a molding process with the material in the mold; and manufacturing the access door from the material during the molding process, wherein the molding step comprises:

forming a body of the access door having a top, a bottom, a first side, and a second side;

integrally forming a deflector and a plurality of ribs with an inner surface of the body, the deflector including a top surface;

forming a width of the deflector to be approximately the same as a width of the body;

forming the top surface of the deflector to be oriented at an angle less than 90° from the body;

forming at least one ridge integrally in the body during the molding process, the at least one ridge extending the width of the body;

removing a first portion of the body by cutting along the at least one ridge from the first side to the second side; and forming a second access door with a remaining portion of the body, the second access door having a height that is less than a height of the body before the removing step.

13. The method of claim 12, further comprising:

removing a second portion from the remaining portion of the body by cutting along a second ridge formed therein; and forming a third access door after the second portion is removed, the third access door having a height that is less than the height of the second access door.

14. The method of claim 10, further comprising:

forming a flange in the bottom of the body; and installing a seal around at least a portion of the top, the first side and the second side of the body.

15. The access door of claim 1, wherein the width of the deflector is substantially the same as the width of the body.

16. The access door of claim 15, wherein the plurality of ribs are not formed in any portion of the deflector.

17. The access door of claim 16, wherein the deflector is positioned along a lower portion of the body.

18. The access door of claim 1, wherein the ridge comprises a first ridge and a second ridge, the first ridge defining a first cut line for forming a first access door from the body and the second ridge defining a second cut line for forming a second access door from the body, the first access door having a smaller height than the second access door.

19. The access door of claim 1, wherein the plurality of ribs are partially formed in the deflector and outwardly extend from the top surface of the deflector toward the top of the body.

20. The method of claim 10, wherein integrally forming the ridge in the body comprises forming a first ridge and forming a second ridge, the first ridge defining a first cut line for forming a first access door from the body and the second ridge defining a second cut line for forming a second access door from the body, the first access door having a smaller height than the second access door.

* * * * *